(12) United States Patent
Lunttila et al.

(10) Patent No.: US 10,904,879 B2
(45) Date of Patent: Jan. 26, 2021

(54) RACH PREAMBLE TRANSMISSION AND MULTIPLEXING WITH DATA AND/OR CONTROL SIGNALS

(71) Applicant: NOKIA SOLUTIONS AND NETWORKS OY, Espoo (FI)

(72) Inventors: Timo Erkki Lunttila, Espoo (FI); Sigen Ye, Whitehouse Station, NJ (US); Esa Tapani Tiirola, Kempele (FI); Kari Juhani Hooli, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/090,337

(22) PCT Filed: Apr. 1, 2016

(86) PCT No.: PCT/US2016/025619
§ 371 (c)(1),
(2) Date: Oct. 1, 2018

(87) PCT Pub. No.: WO2017/171847
PCT Pub. Date: Oct. 5, 2017

(65) Prior Publication Data
US 2019/0124649 A1    Apr. 25, 2019

(51) Int. Cl.
*H04W 4/00* (2018.01)
*H04W 72/04* (2009.01)
(Continued)

(52) U.S. Cl.
CPC ......... *H04W 72/0446* (2013.01); *H04L 5/001* (2013.01); *H04L 5/0041* (2013.01);
(Continued)

(58) Field of Classification Search
None
See application file for complete search history.

(56) References Cited

U.S. PATENT DOCUMENTS

2007/0036179 A1  2/2007 Palanki et al.
2008/0095254 A1  4/2008 Muharemovic et al.
(Continued)

OTHER PUBLICATIONS

International Search Report and Written Opinion dated Jun. 27, 2016 corresponding to International Patent Application No. PCT/US2016/025619.
(Continued)

*Primary Examiner* — Zewdu A Beyen
(74) *Attorney, Agent, or Firm* — Squire Patton Boggs (US) LLP

(57) ABSTRACT

Various communication systems may benefit from improved uplink data transmission. A method may include determining an assignment, at a user equipment, of a first set of physical resource blocks in an unlicensed spectrum to a physical random access channel. The physical random access channel occupies at least one of the physical resource blocks, and wherein the at least one of the physical resource blocks occupied by the physical random channel are distributed into clusters in a frequency domain. The method may also include determining an assignment, when the user equipment transmits data, of a second set of at least one remaining physical resource block of the physical resource blocks to at least one uplink channel. In addition, the method can include transmitting random access preambles through the physical radio access channel or data through of the at least one the uplink channel from the user equipment to a network entity.

19 Claims, 15 Drawing Sheets

(51) Int. Cl.
*H04L 5/00* (2006.01)
*H04W 74/08* (2009.01)
*H04L 27/26* (2006.01)

(52) U.S. Cl.
CPC .......... *H04L 5/0048* (2013.01); *H04L 5/0064* (2013.01); *H04L 5/0094* (2013.01); *H04L 27/2613* (2013.01); *H04W 74/0833* (2013.01); *H04L 5/0023* (2013.01); *H04L 27/2636* (2013.01); *H04L 27/2643* (2013.01)

(56) References Cited

U.S. PATENT DOCUMENTS

| | | |
|---|---|---|
| 2009/0201877 A1 | 8/2009 | Noh et al. |
| 2011/0090863 A1 | 4/2011 | Hao et al. |
| 2012/0044897 A1* | 2/2012 | Wager .................. H04L 5/0037 370/329 |
| 2012/0077508 A1 | 3/2012 | Khan et al. |
| 2012/0236803 A1 | 9/2012 | Vujcic |
| 2013/0208684 A1 | 8/2013 | Ozluturk |
| 2015/0029943 A1 | 1/2015 | Ratasuk et al. |
| 2015/0049712 A1* | 2/2015 | Chen .................. H04W 72/1215 370/329 |
| 2015/0156638 A1 | 6/2015 | Yerramalli et al. |
| 2016/0037352 A1 | 2/2016 | Wei et al. |
| 2016/0174109 A1* | 6/2016 | Yerramalli ............ H04W 28/26 370/329 |

OTHER PUBLICATIONS

Supplementary European Search Report dated Oct. 30, 2019 corresponding to European Patent Application No. 16897387.3.

NTT Docomo, Inc., "Discussion on PRACH for eLAA UL," 3GPP Draft; R1-160950, 3GPP TSG RAN WG1 Meeting #84, St. Julian's, Malta Feb. 15-19, 2016, Feb. 14, 2016, XP051054258.

MediaTek Inc., "Considerations on PRACH for LAA," 3GPP Draft; R1-160975, 3GPP TSG RAN WG1 Meeting #84, St. Julian's, Malta, Feb. 15-19, 2016, Feb. 14, 2016, XP051054281.

* cited by examiner

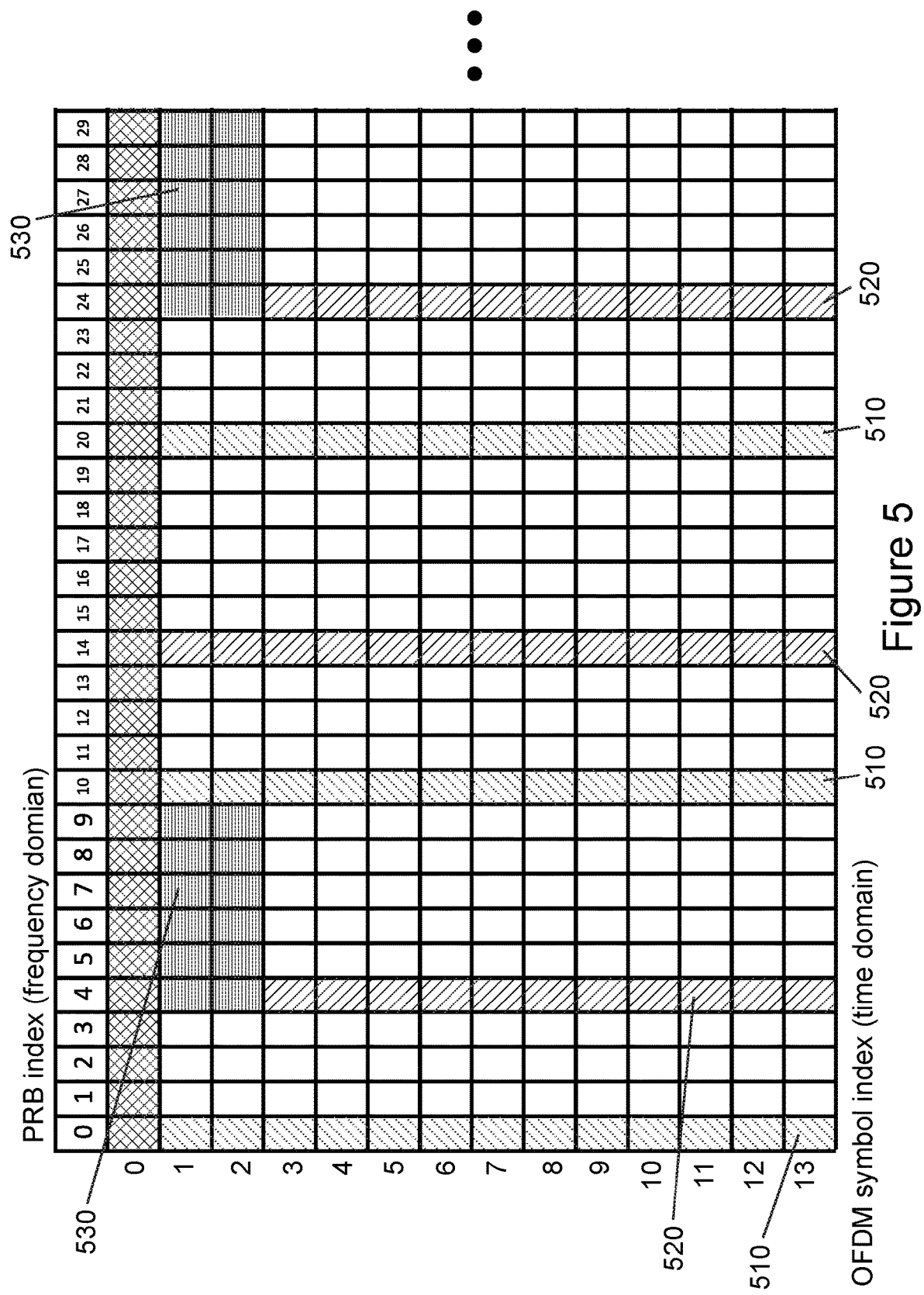

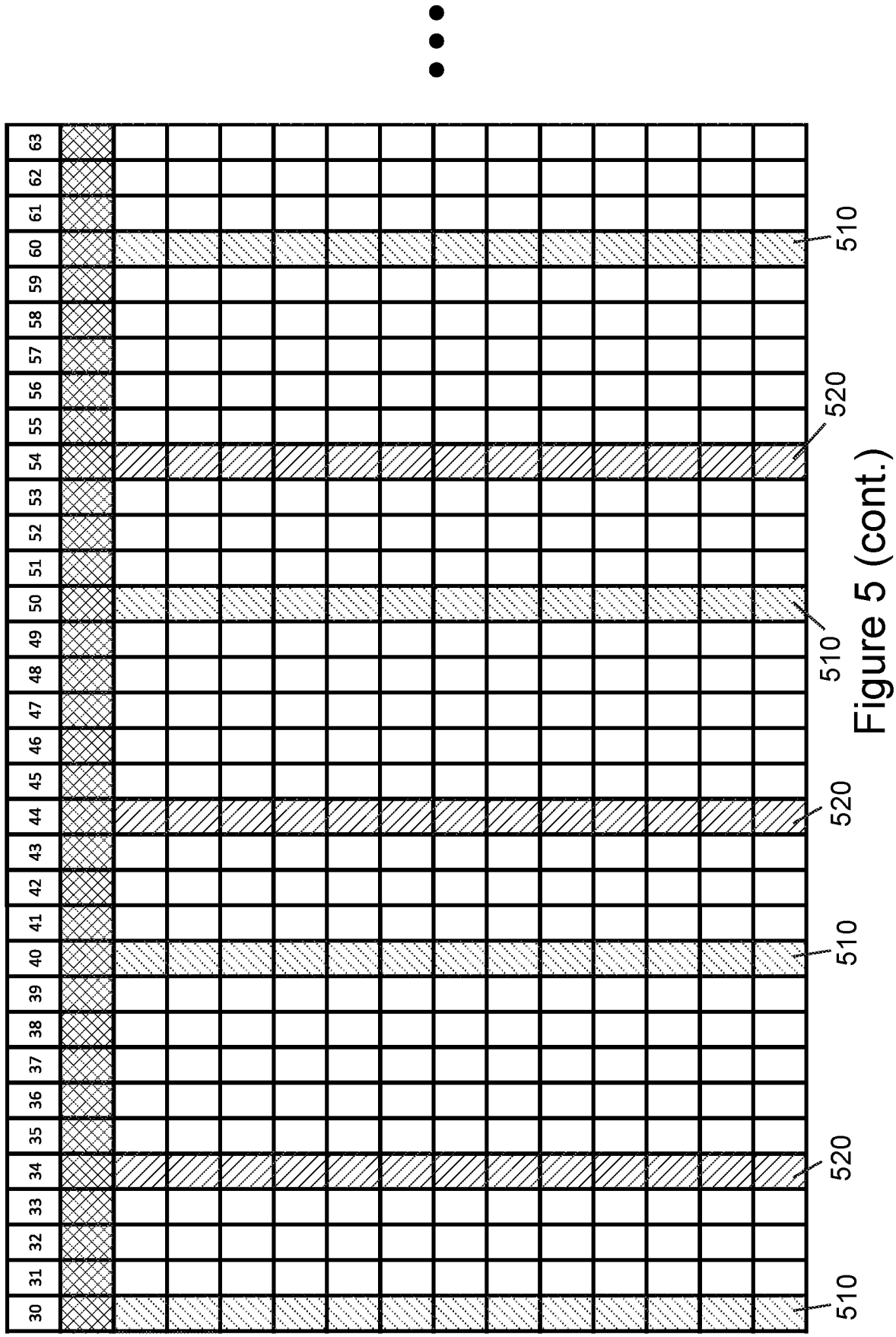

RACH PREAMBLE TRANSMISSION AND MULTIPLEXING WITH DATA AND/OR CONTROL SIGNALS

BACKGROUND

Field

Various communication systems may benefit from improved uplink data transmission. For example, certain communication systems may benefit from an enhanced license assisted access uplink for a standalone operation on an unlicensed spectrum.

Description of the Related Art

In mobile networks, involving $3^{rd}$ Generation Partnership Project (3GPP) technology, for example, Long Term Evolution (LTE), license-assisted access (LAA) helps to support network access to an unlicensed spectrum. Unlicensed spectrum, such as 5 GHz, can be utilized to further improve LTE downlink throughput, by increasing the amount of resources available to the network. To do so, one or more LAA downlink secondary cells (SCells) may be configured for a user equipment, as part of downlink carrier aggregation configuration, while the primary cell may be on a licensed spectrum.

LTE may be further enhanced to support LAA uplink operations in standalone operation on unlicensed carriers. LTE standalone operation on an unlicensed carrier may mean that the air interface between the base station, such as evolved Node B (eNB), and a user equipment (UE) can rely solely on unlicensed spectrum without utilizing any carrier on a licensed spectrum. However, LTE LAA solution based on a carrier aggregation framework still assumes transmission of uplink control information (UCI), including physical random access channels (PRACH), on a primary cell using a licensed band. Given the increase utilization of the unlicensed spectrum, it may be helpful to provide for an uplink without needing a carrier on the licensed spectrum.

SUMMARY

According to certain embodiments, an apparatus may include at least one memory including computer program code, and at least one processor. The at least one memory and the computer program code may be configured, with the at least one processor, to determine an assignment, at a user equipment, of a first set of physical resource blocks in an unlicensed spectrum to a physical random access channel. The physical random access channel can occupy at least one of the physical resource blocks, and the at least one of the physical resource blocks occupied by the physical random channel are distributed into clusters in a frequency domain. The at least one memory and the computer program code may also be configured, with the at least one processor, to cause the apparatus at least to determine an assignment, when the user equipment has reason to transmit data, of a second set of at least one remaining physical resource block of the physical resource blocks to at least one uplink channel. In addition, the at least one memory and the computer program code may be configured, with at least one processor, to cause the apparatus to transmit random access preambles through the physical radio access channel or data though the at least one uplink channel from the user equipment to a network entity.

A method, in certain embodiments, may include determining an assignment, at a user equipment, of a first set of physical resource blocks in an unlicensed spectrum to a physical random access channel. The physical random access channel can occupy at least one of the physical resource blocks, and the at least one of the physical resource blocks occupied by the physical random channel are distributed into clusters in a frequency domain. The method may also include determining an assignment, when the user equipment has reason to transmit data, of a second set of at least one remaining physical resource block of the physical resource blocks to at least one uplink channel. In addition, the method can include transmitting random access preambles through the physical radio access channel or the data through the at least one uplink channel from the user equipment to a network entity.

An apparatus, in certain embodiments, may include means for determining an assignment, at a user equipment, of a first set of physical resource blocks in an unlicensed spectrum to a physical random access channel. The physical random access channel can occupy at least one of the physical resource blocks, and the at least one of the physical resource blocks occupied by the physical random channel are distributed into clusters in a frequency domain. The apparatus may also include means for determining an assignment, when the user equipment has reason to transmit data, of a second set of at least one remaining physical resource block of the physical resource blocks to at least one uplink channel. In addition, the apparatus may also include means for transmitting random access preambles through the physical radio access channel or the data through the at least one uplink channel from the user equipment to a network entity.

According to certain embodiments, a non-transitory computer-readable medium encoding instructions that, when executed in hardware, perform a process. The process may include determining an assignment, at a user equipment, of a first set of physical resource blocks in an unlicensed spectrum to a physical random access channel. The physical random access channel can occupy at least one of the physical resource blocks, and the at least one of the physical resource blocks occupied by the physical random channel are distributed into clusters in a frequency domain. The process may also include determining an assignment, when the user equipment has reason to transmit data, of a second set of at least one remaining physical resource block of the physical resource blocks to at least one uplink channel. In addition, the process may include transmitting random access preambles through the physical radio access channel or the data through the at least one uplink channel from the user equipment to a network entity.

According to certain other embodiments, a computer program product may encode instructions for performing a process. The process may include determining an assignment, at a user equipment, of a first set of physical resource blocks in an unlicensed spectrum to a physical random access channel. The physical random access channel can occupy at least one of the physical resource blocks, and the at least one of the physical resource blocks occupied by the physical random channel are distributed into clusters in a frequency domain. The process may also include determining an assignment, when the user equipment has reason to transmit data, of a second set of at least one remaining physical resource block of the physical resource blocks to at least one uplink channel. In addition, the process may include transmitting random access preambles through the physical radio access channel or the data through the at least one uplink channel from the user equipment to a network entity.

BRIEF DESCRIPTION OF THE DRAWINGS

For proper understanding of the invention, reference should be made to the accompanying drawings, wherein.

DETAILED DESCRIPTION

Figure 1:
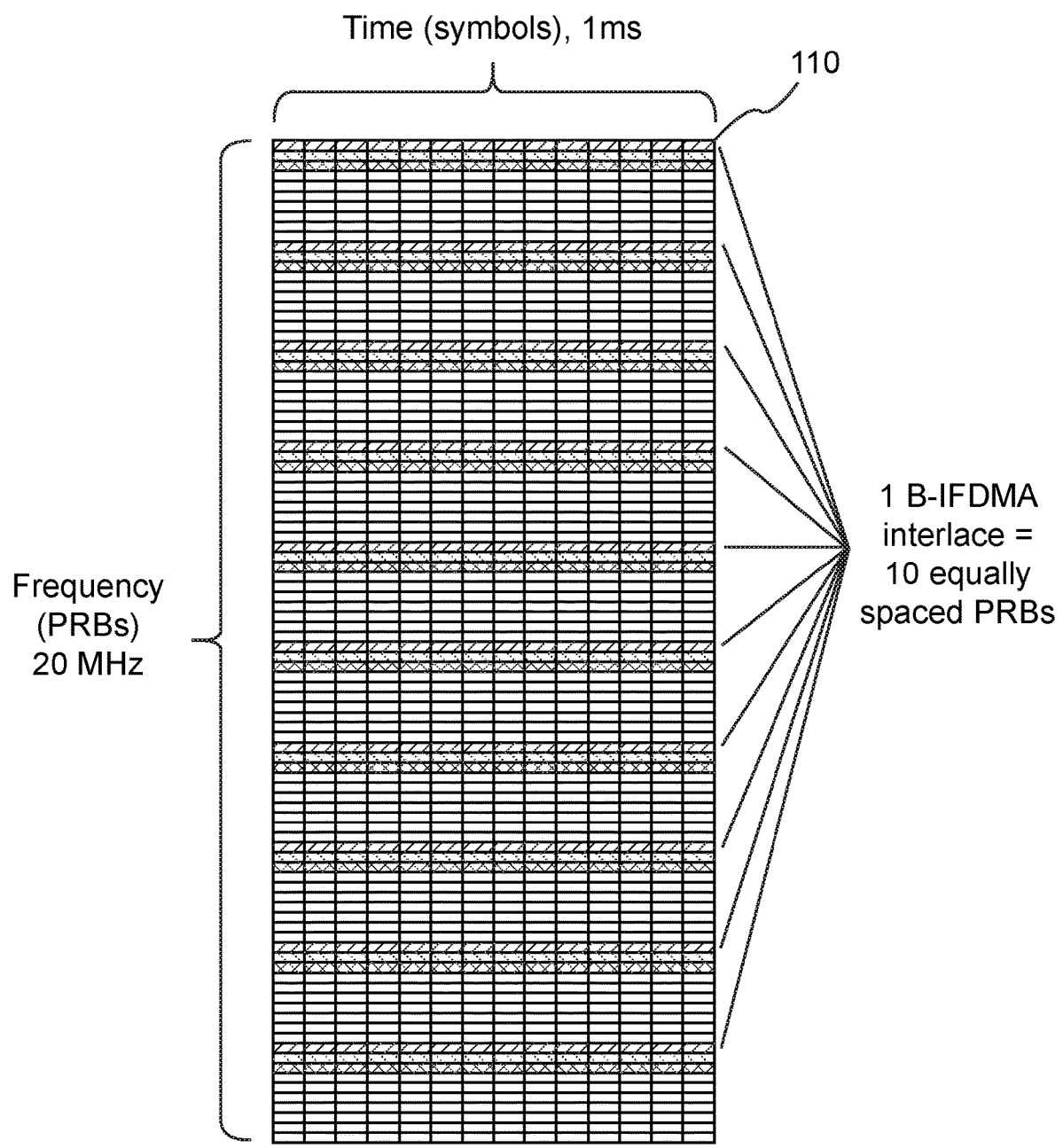
FIG. 1 illustrates a baseline uplink transmission scheme according to certain embodiments.

Certain embodiments can provide support for LAA enhancements, and support for LAA uplink operation on an unlicensed spectrum. Some embodiments may achieve such LAA enhancement by facilitating an efficient multiplexing of PRACH and physical uplink shared channels (PUSCH) and/or physical uplink control channels (PUCCH) in an unlicensed spectrum or band operation. The proper placement of PRACH can allow a UE to meet bandwidth occupancy requirements or rules. Some embodiments, therefore can take into account, and comply with, regulatory rules or requirements, such as bandwidth occupancy. PRACH can be used for the transmission of a random access preamble from a user equipment to a network entity.

In certain embodiments, the preamble may include a Long Term Evolution physical random access channel preamble. The preamble may include at least one of a predetermined preamble format, a preamble sequence, or a cyclic shift mapped to each of the clusters in the frequency domain.

LTE standalone operation on unlicensed spectrum can mean that the network entity or UE air interface relies solely on unlicensed spectrum, without having any carrier on the licensed spectrum. In some embodiments that involve an LTE operation on unlicensed carriers, the UE may need to perform listen-before-talk (LBT) prior to conducting an uplink (UL) transmission. Whether or not the UE will perform LBT may depend on various regulatory rules. Some of the regulatory requirements or rules discussed herein may be regulations set by the European Telecommunications Standard Institute (ETSI), 3GPP, or any other standard setting organization.

However, in certain embodiments the UE may not need to perform LBT. For example, short control signaling (SCS) can allow for the transmission of control signaling with a duty cycle of no more than 5% over a 50 millisecond period without performing LBT. SCS transmissions can be used by adaptive equipment to send management and control frames, such as acknowledgement (ACK) and negative acknowledgment (NACK) signals, without sensing the channel for the presence of other signals. In certain embodiments, adaptive equipment may not be needed to implement SCS transmission. Another example in which LBT may not be needed includes transmission of ACK/NACK feedback when immediately following a downlink transmission, which may be similar to wireless land access network (WLAN) operations.

In yet another example, scheduled uplink transmissions may be allowed without LBT when the transmission directly follows a downlink transmission, if the eNB has performed LBT before the downlink transmission. The total transmission time, however, that covers both the downlink and the uplink is limited by the maximum transmission burst time defined by the regulator.

In certain embodiments, to ensure reliable operation with LBT, transmissions may occupy effectively the whole nominal channel bandwidth. For example, the occupied bandwidth may be between 80% and 100% of the declared nominal channel bandwidth. In a further example, a 20 megahertz (MHz) nominal channel bandwidth, may mean that an LTE LAA transmission occupies a bandwidth of at least 16 MHz (0.8×20 MHz), or about 88.89 PRBs.

In other words, the uplink transmissions such as PRACH, PUCCH, and/or PUSCH may in certain embodiments occupy a large bandwidth. As will be discussed below, Block Interleaved Frequency Division Multiple Access (B-IFDMA) may be used to achieve such high bandwidth percentages. The 3GPP TSG RAN WG1 meeting #81, On UL multiplexing in the LAA scenario, R1-152815, Fukuoka, Japan, May 2015, is hereby incorporated in its entirety.

Certain embodiments may have a set maximize transmission power and/or a maximum allowed power spectral density (PSD) for a UE. These maximums can be set by a standard setting organization. For example, the maximum allowed PSD may be a resolution bandwidth of 1 MHz. In another example, a maximum PSD of 10 dBm/MHz for 5150-5350 MHz, or a 5.15-5.725 MHz 11 dBm/MHz. dBm can represent a power ratio in decibels (dB) of the measured power in relation to one milliwatt (mW).

FIG. 1 illustrates a baseline uplink transmission scheme according to certain embodiments. In particular, FIG. 1 shows an uplink transmission according to B-IFDMA. In certain embodiments, B-IFDMA may be a baseline uplink transmission scheme used for uplink transmission in unlicensed spectrum. Wideband transmission may be used, meaning that all signals can be easily detectable by the neighboring nodes. Certain embodiments, such as the embodiment shown in FIG. 1, may involve PUSCH transmission according to B-IFDMA on interlaces having 10 equally spaced clusters. In certain embodiments, one cluster may be a physical resource block (PRB). In other embodiments, one transmission may include one or more B-IFDMA interlaces.

As can be seen in the embodiments of FIG. 1, one B-IFDMA interlace 110 can include 10 equally spaced PRBs. The frequency of each PRB may be 20 MHz, and each PRB may be 1 millisecond long. This B-IFDMA may allow for various advantages, including good coexistence with LTE, good multiplexing capacity (up to 10 parallel interlaces), and good resource scalability by means of variable cluster size. The B-IFDMA may also allow for a fixed size resource for all interlaces with given cluster size, and can also provide for good coverage while satisfying the regulatory PSD requirements. In addition, embodiment 110 may be compatible with ETSI bandwidth occupancy rules, such as bandwidth containing 99% of the power signal having between 80% and 100% of the declared nominal channel bandwidth. B-IFDMA may be compatible with any other bandwidth occupancy rule set by any regulatory or standard setting body.

While B-IFDMA may be suitable for PUSCH and PUSCH transmission, it may prohibit, in certain embodiments, an accurate timing estimation having a reasonable timing certainty. Certain embodiments may also not be capable of adequately supporting medium to large cells. Accurate timing estimation and timing uncertainty may be particularly helpful to a PRACH design. For example, using PRACH preambles that occupy six contiguous preambles may result in better timing estimation accuracy than with B-IFDMA.

In certain embodiments, achieving adequate timing resolution can correlate with the bandwidth of the receive PRACH signal. Simultaneous transmission of multiple LTE PRACH preambles on different frequency resources may be used in LAA.

In some embodiments, proper placement of PRACH clusters can allow a UE to meet bandwidth occupancy requirements or rules, especially in medium to large cells. Certain embodiments may rely on efficient multiplexing of PRACH and PUSCH and/or PUCCH in an unlicensed band operation, bearing in mind the necessary regulatory requirements or rules, such as bandwidth occupancy.

In certain embodiments, PRACH transmission may be in a regular subframe having a 1 ms length, as well as in an uplink pilot time slot (UpPTS) along with short physical uplink control channels (sPUCCH). sPUCCH can correspond to short PUCCH structure. sPUCCH may be used for hybrid automatic repeat request (HARQ) acknowledgment, service request (SR), remote access (RA) preamble, service request signal (SRS), and channel state information (CSI). In some embodiments, sPUCCH may be available at the end of each downlink transmission burst. sPUCCH time duration may be, for example, up to 4 symbols. In certain embodiments the symbols may be DFT-S-OFDMA or SC-FDMA, and may contain a cyclic prefix.

Figure 2:
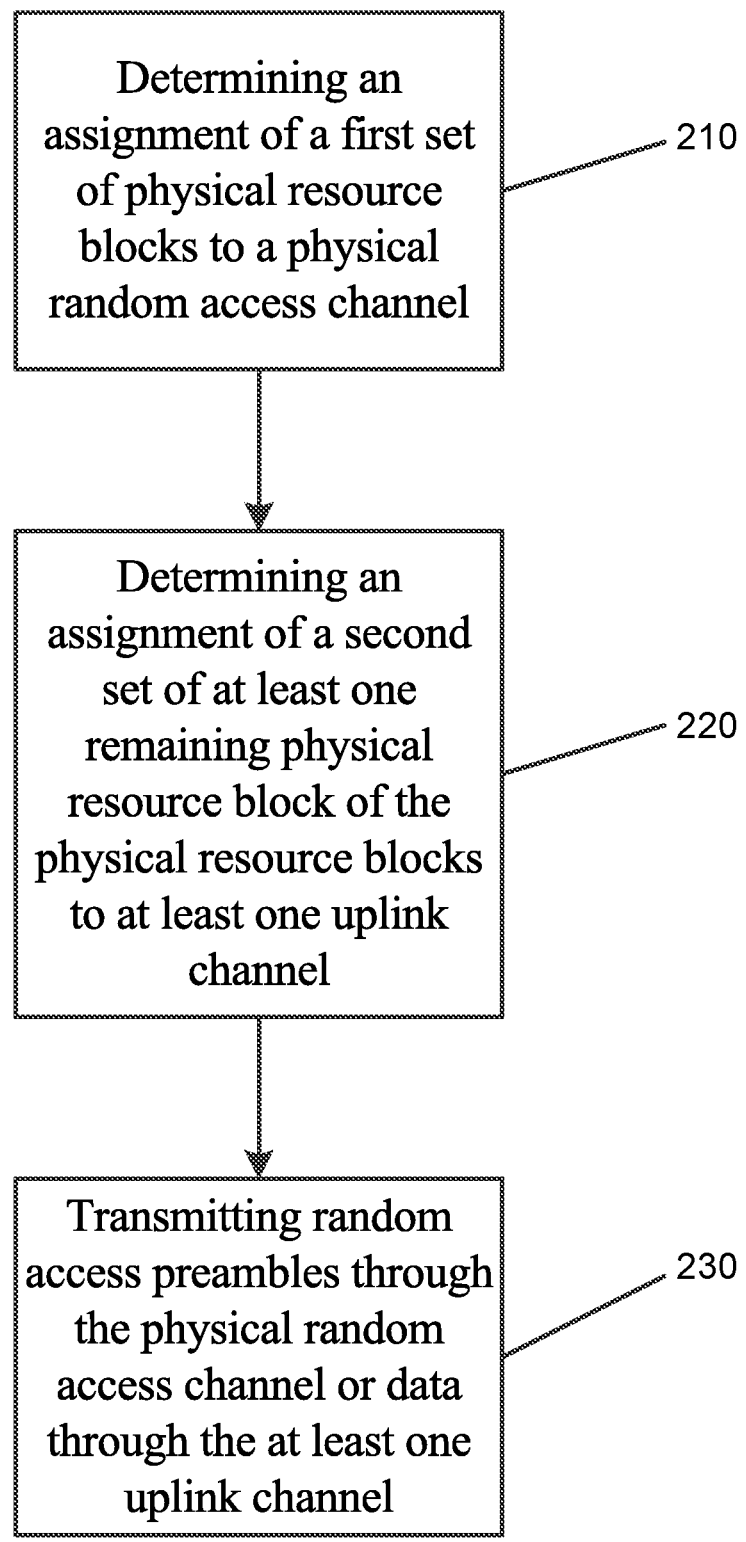
FIG. 2 illustrates a flow diagram according to certain embodiments.

FIG. 2 illustrates a flow diagram according to certain embodiments. In step 210, a user equipment may determine an assignment of a first set of PRBs in an unlicensed spectrum to a PRACH. The PRACH occupies at least one of the PRBs. In certain embodiments, PRACH waveform may occupy N×6 PRBs, with N being a positive integer defining the number of PRACH clusters, and 6 being the number of PRBs the cluster occupies. Alternatively, the PRACH waveform may occupy any number of PRBs. The N PRACH clusters, can have M consecutive PRBs each, and can be arranged to form a wideband signal.

In certain embodiments, the UE may receive the assignment information, or configuration information of the PRBs, from higher layer signaling. Higher layer signaling may include, for example, RRC configuration or system information broadcast signaling, which can be sent from a network entity. The configuration may be sent to the UE from the serving cell and/or from a non-serving cell. In embodiments in which the non-serving cell sends the configuration to the UE, the non-serving cell may be also a cell operating in licensed band.

Figure 3:
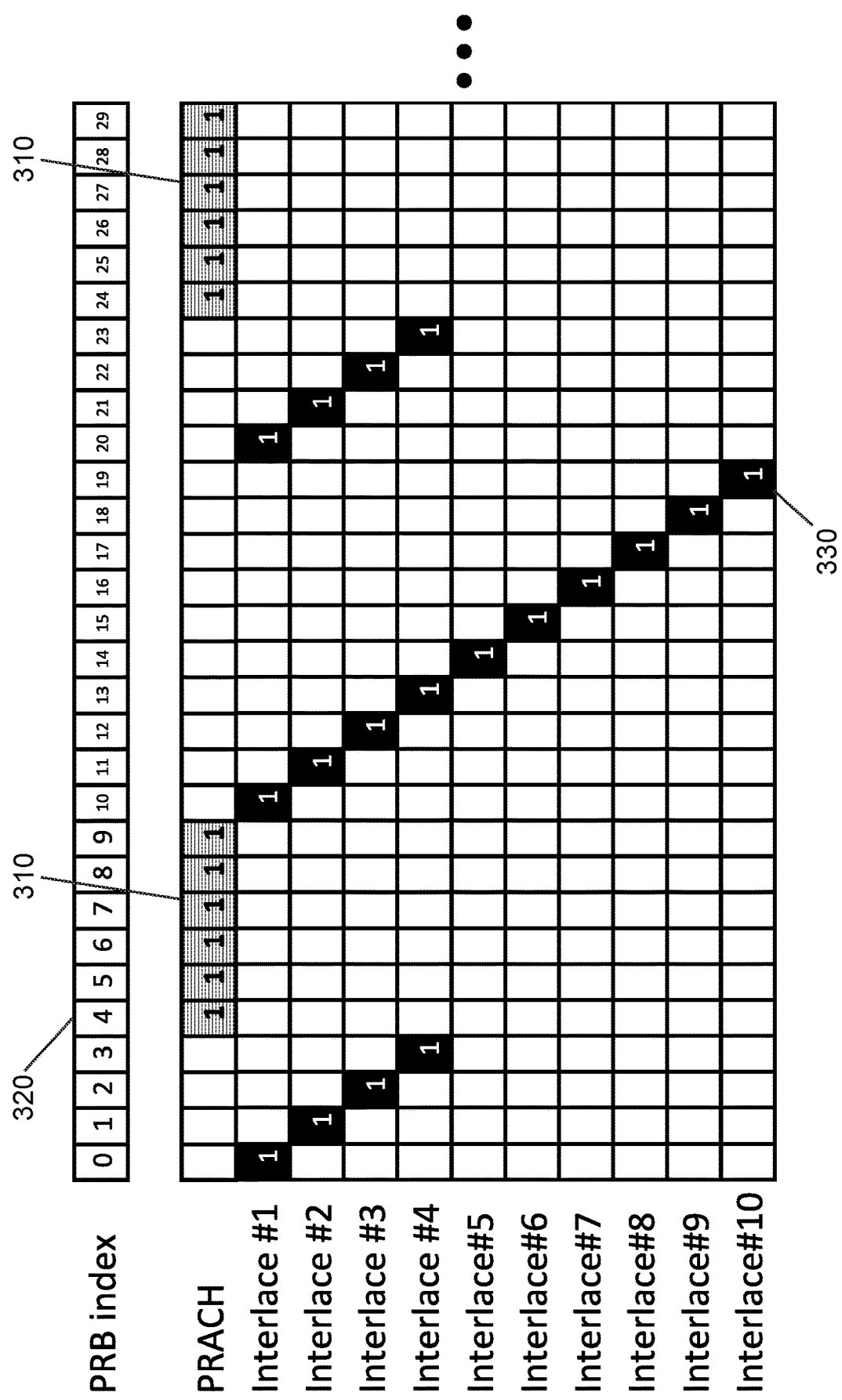
FIG. 3 illustrates an assignment according to certain embodiments.
Figure 3:
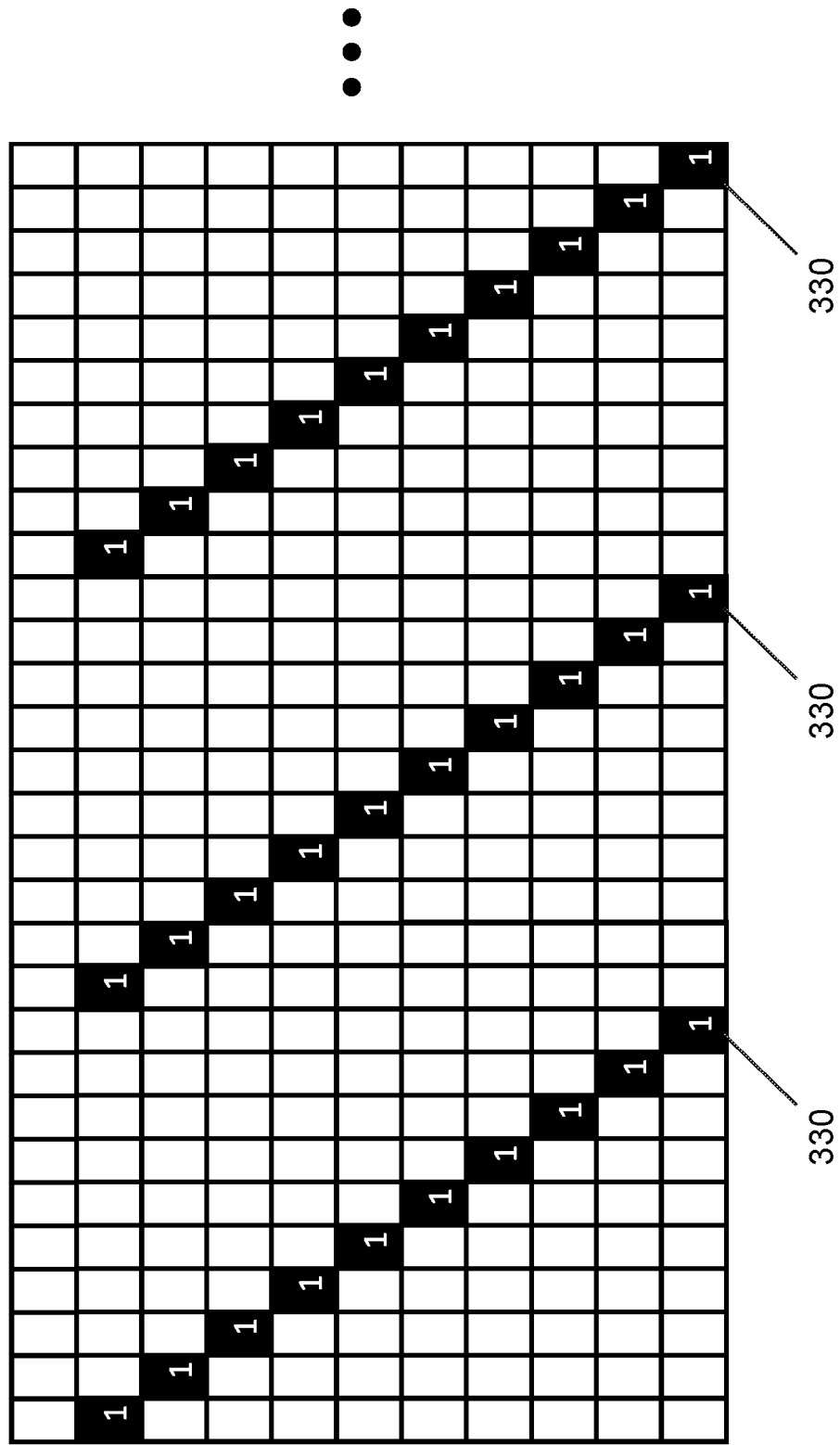
Figure 3:
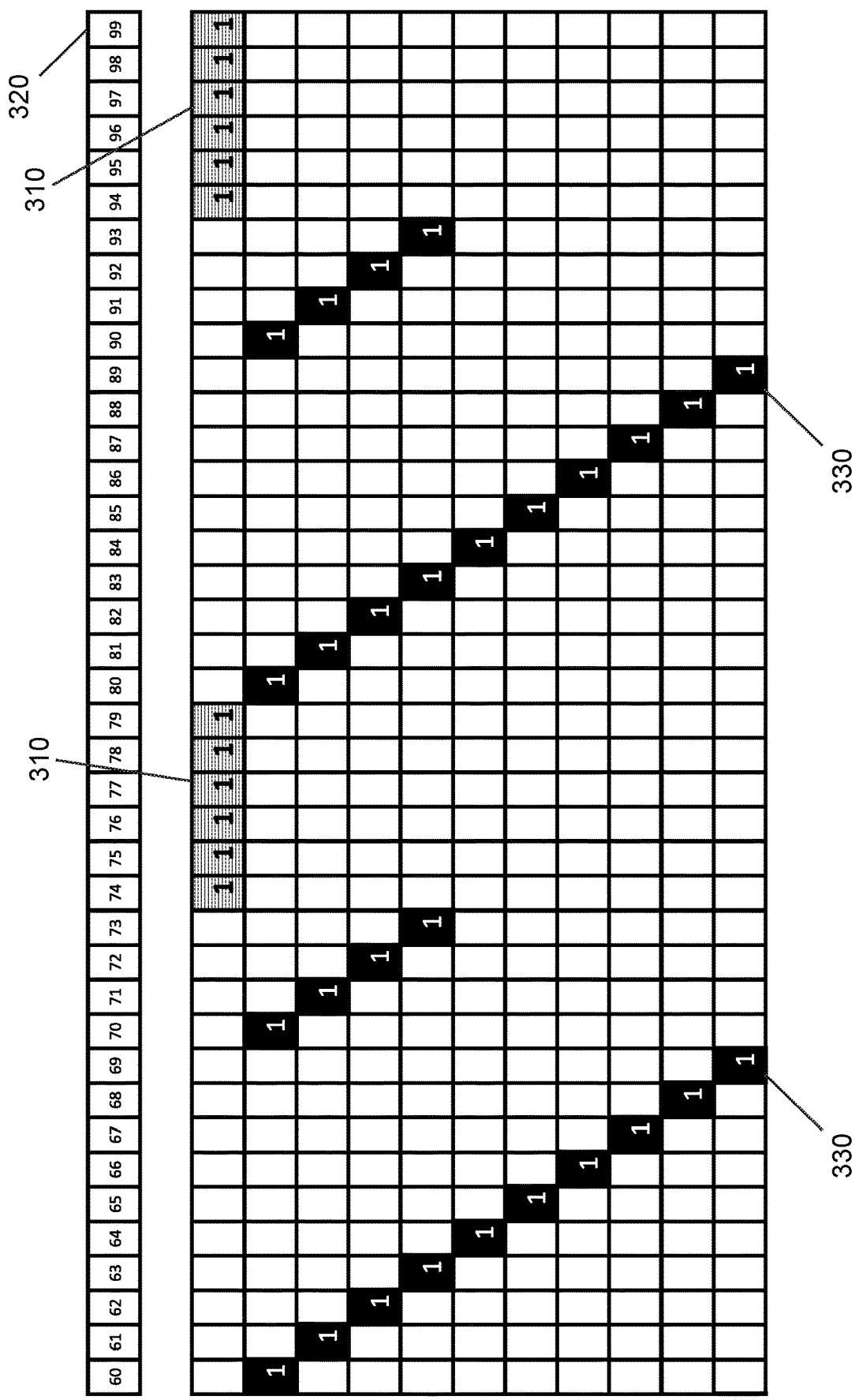

A wideband signal may meet certain rules and/or requirements for bandwidth occupancy. For example, separation between the two outermost PRBs assigned to PRACH may represent at least 80% of the bandwidth. Further, spacing of PRACH clusters may be within minimum and maximum values, where the minimum spacing is defined so that there is only one PRACH cluster per PSD measurement bandwidth, as defined by a rule or regulation. The space between PRBs 320 in FIG. 3 represents this spacing between the outermost PRBs assigned to PRACH.

Certain other embodiments may have a maximum spacing rule or regulation. The maximum spacing may be equal to the minimum carrier bandwidth allowed on the spectrum band. Minimum spacing limits may allow for maximizing transmission power under regulatory limits for PSD, while the maximum spacing limit may ensure for a robust LBT operation across different radio access technologies.

There can be various ways to arrange PRACH clusters on the system bandwidth, as will be discussed below and illustrated in FIGS. 3, 4A, 4B and 5. In certain embodiments the number of PRACH clusters N may be a design parameter and may be selected according to PRACH coverage target and/or PRACH overhead in terms of PRBs. PRACH coverage target can be particularly important in a PSD-limited scenario.

For example, PDS may be limited to 10 dBm/MHz, and PRACH bandwidth can be 1 MHz. In an embodiment having two clusters with 1 MHz, the UE may transmit with 13 dBm. Increasing the number of clusters, however, can allow for increasing the transmission power by 10 dBm/MHz for each added cluster.

In certain embodiments, the number of PRACH clusters N can be configured to the UE via higher layer signaling, for example, system information broadcast or dedicated RRC signaling. In certain other embodiments, the value of N may be fixed according to bandwidth requirements. In certain embodiments, wideband PRACH format may be combined with unlicensed band usage and/or certain other PRACH configurations.

The remaining PRBs not used for PRACH may be made available for PUSCH and/or PUCCH. In other words, PRACH may be multiplexed with PUSCH and/or PUCCH in the same subframe. As shown in step 220, the user equipment can determine, when the user equipment has reason to transmit data, assigning at least one of the remaining PRBs in the unlicensed spectrum to an uplink data channel. The at least one of the PRBs occupied by the PRACH may be distributed into clusters in a frequency domain. In addition, at least one PUSCH interlace may be formed such that certain regulatory rules are fulfilled, for example, a regular PUSCH interlace may be an interlace formed having 10 PRBs, similar to the B-IFDMA shown in FIG. 1. A regular PUSCH interlace may be used for PUSCH and/or PUCCH. Examples of a regular interlace will be discussed below.

Figure 5:
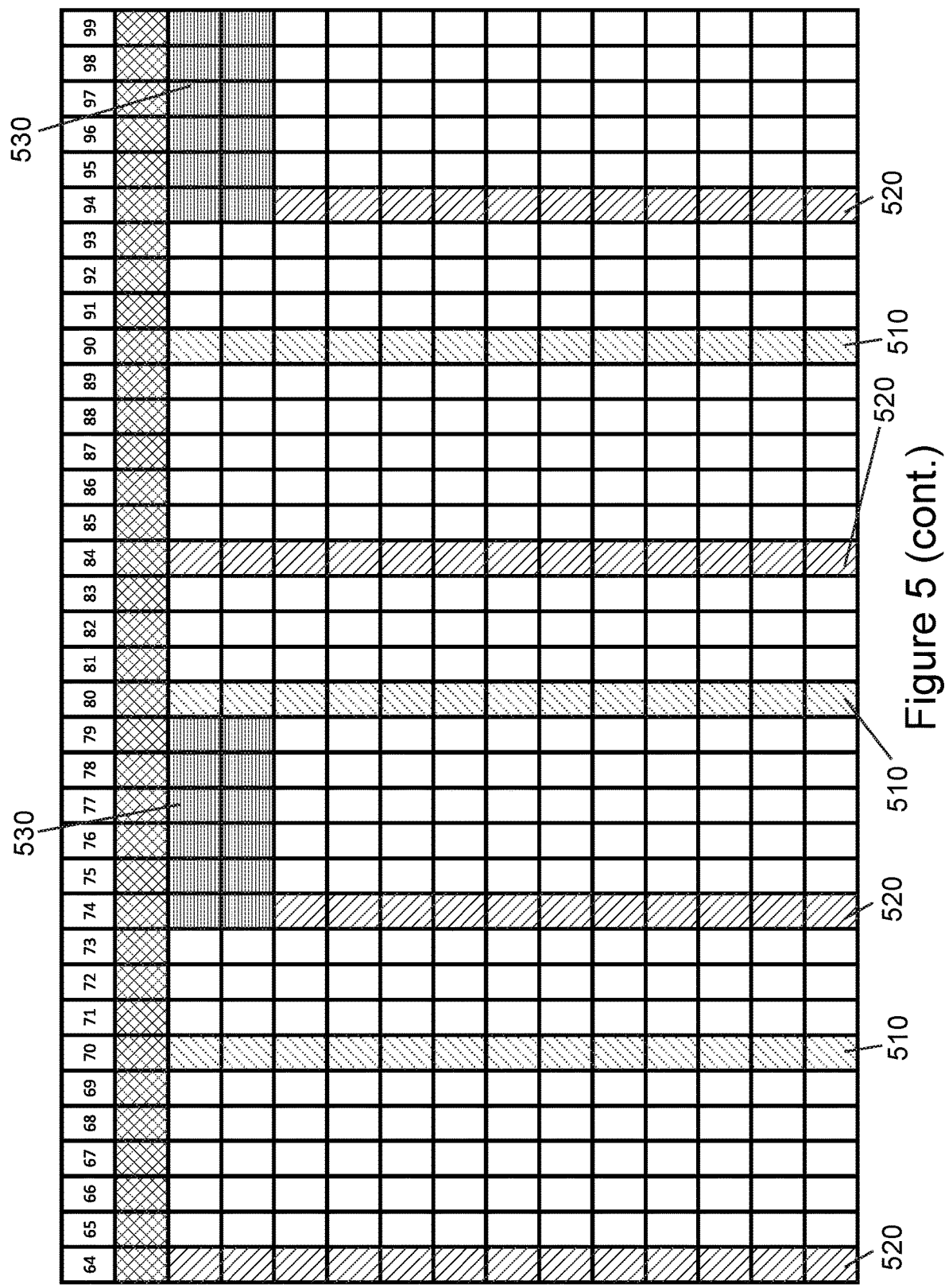
FIG. 5 illustrates an assignment according to certain embodiments.

Certain embodiments may be based on utilization of PRBs with fixed spacing, such as B-IFDMA interlace, while others may be based on utilization of PRBs with variable spacing, for example, non-uniform interlace. FIG. 5 will be used to further explain the fixed and variable embodiments of the PRBs. In embodiments based on utilization of PRBs with fixed spacing, the user equipment may not need to be aware of the presence of PRACH subframe, since the PRBs assignment to the uplink data are fixed.

Certain embodiments may not be used as regular interlaces, for example, because of a bandwidth occupancy rule and/or because that they contain less than 10 PRBs. These remaining PRBs can be arranged to form one or more irregular interlaces. An irregular interlace may not be used as a standalone resource, but can be allocated for a user equipment together with one or more regular interlaces. As discussed above, PRACH subframes can be configured in a cell-specific manner. PUSCH and/or PUCCH resources may follow normal 10-interlace structure, as shown in FIG. 1, in the absence of PRACH subframes. In other embodiments, PUSCH and/or PUCCH resources may follow an interlace structure in the presence of a PRACH subframe.

In some embodiments, the PRACH and/or PUSCH and/or PUCCH transmissions in a regular subframe, having a 10 PRB interlace, does not occupy the full subframe due to LBT, SRS transmissions, and guard period of PRACH. In certain embodiments, regular interlaces may have equal spacing between all neighboring clusters of the interlace.

The assignments, shown in steps 210 and 220 of FIG. 2, can be made in accordance with predetermined bandwidth occupancy requirements. In step 230, once PRBs have been assigned, random access preambles may then be transmitted through the PRACH or data may be transmitted through the at least one uplink data channel from the user equipment to a network entity, such as an evolved NodeB. The data may be user data and/or control data. In some embodiments only some PRBs in a subframe are assigned to PRACH and PUSCH/PUCCH, while others are either vacant or assigned for other reasons.

In certain embodiments, PRACH may be shorter in time than PUSCH and/or PUCCH in a subframe when PUSCH/PUCCH are based on fixed spacing within each B-IFDMA interlace. The frequency resources used for PRACH in these embodiments may be the same as described above, but PRACH transmission may occupy some of the symbols within the subframe. The PUSCH/PUCCH interlace can be based on utilization of PRBs with fixed spacing, but the resource elements (REs) used for PRACH may be punctured in the corresponding PUSCH/PUCCH interlace.

In other words, instead of using pure frequency division multiplex (FDM) between PRACH and PUSCH/PUCCH, a combination of FDM/time division multiplex (TDM) can be used. The combination of FDM/TDM may be particularly useful when the expected cell radius may be small, and a short PRACH preamble is sufficient. This combination may allow the uplink channels to puncture those PRBs assigned for PRACH.

FIG. 3 illustrates an assignment of physical resource blocks according to certain embodiments. In particular, FIG. 3 may illustrate an example of a proposed B-IFDMA interlace arrangement having fixed spaced PRBs. As can be seen in the interlace of FIG. 3, N=4 while M=6, meaning that the number of PRACH clusters 310 is four and the number of consecutive PRACH PRBs per cluster 310 is six. Certain embodiments of the PRACH design can meet bandwidth occupancy requirements, for example, ETSI requirements, since the spacing between the outermost PRACH PRBs 320 is about 96. In certain embodiments, PRACH bandwidth may be 96×180 kHz=17.28 MHz.

In the embodiment of FIG. 3, interlaces 1, 2, 3, and 4 may be unchanged, and can consistent of 10 PRBs. This can be characterized as a regular interlace, similar to the B-IFDMA shown in FIG. 1. PRACH resources, however, may at least partially puncture interlaces 5, 6, 7, 8, 9, and/or 10. Puncture can mean that PRBs that would otherwise be allocated to PUSCH and/or PUCCH are allocated to PRACH. In the embodiment of FIG. 3, for example, one PRACH cluster punctures PUSCH and/or PUCCH at PRBs 4 through 9. On these punctured interlaces, only four PRBs may be available for PUSCH or PUCCH transmission. Non-punctured interlaces 330, on the other hand, allow for 10 PRBs available for PUSCH and/or PUCCH.

Figure 4A:
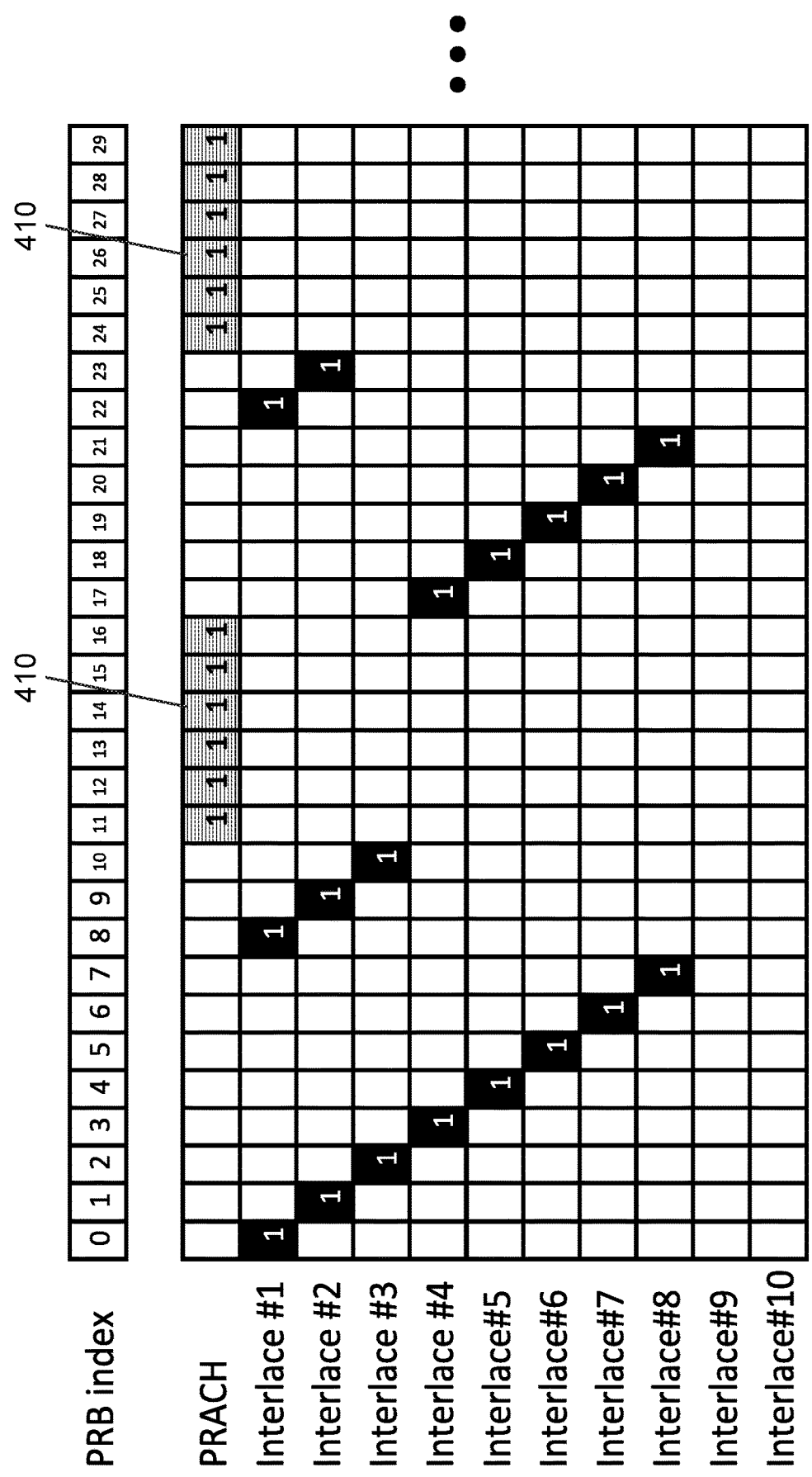
FIG. 4A illustrates an assignment according to certain embodiments.
Figure 4A:
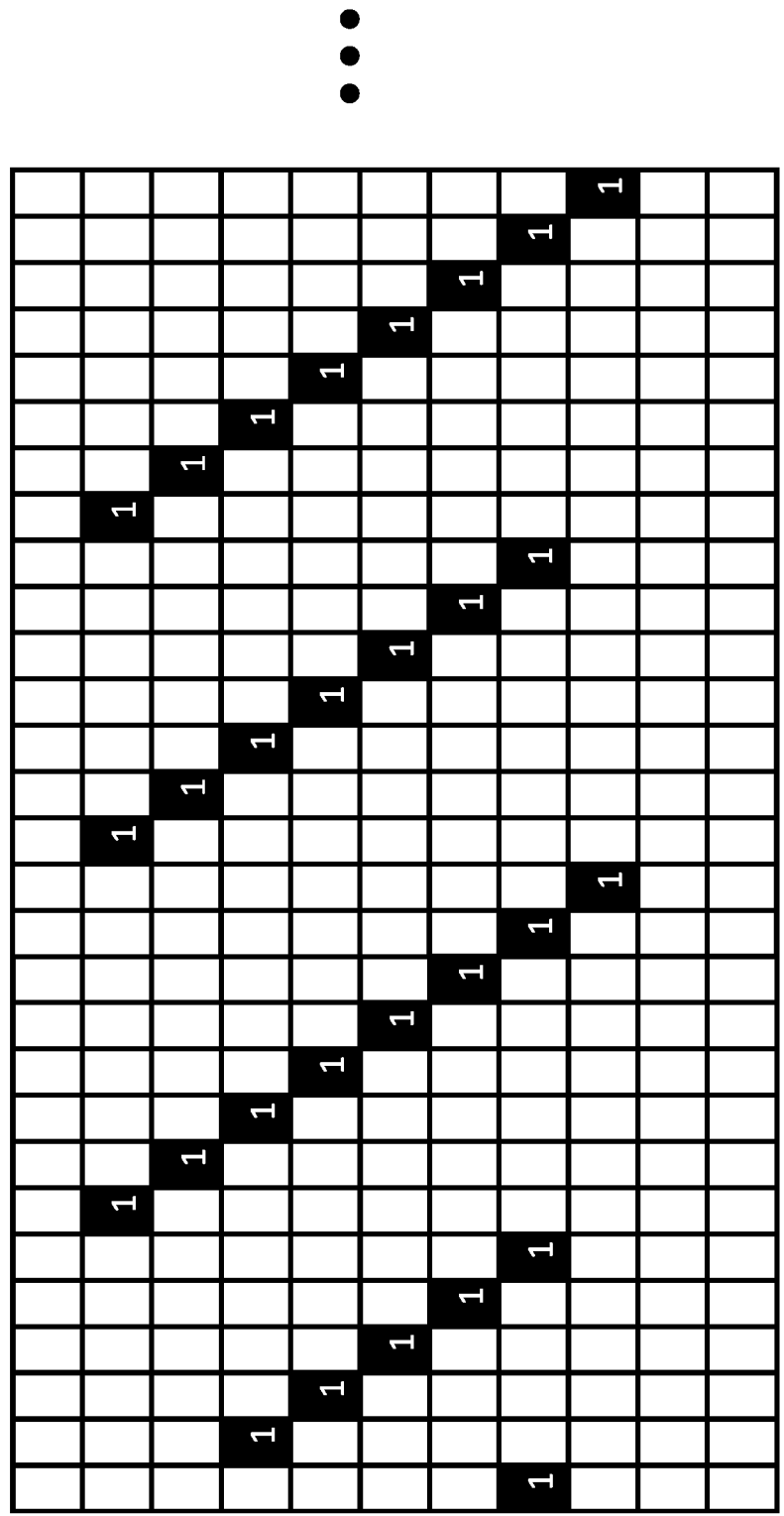
Figure 4A:
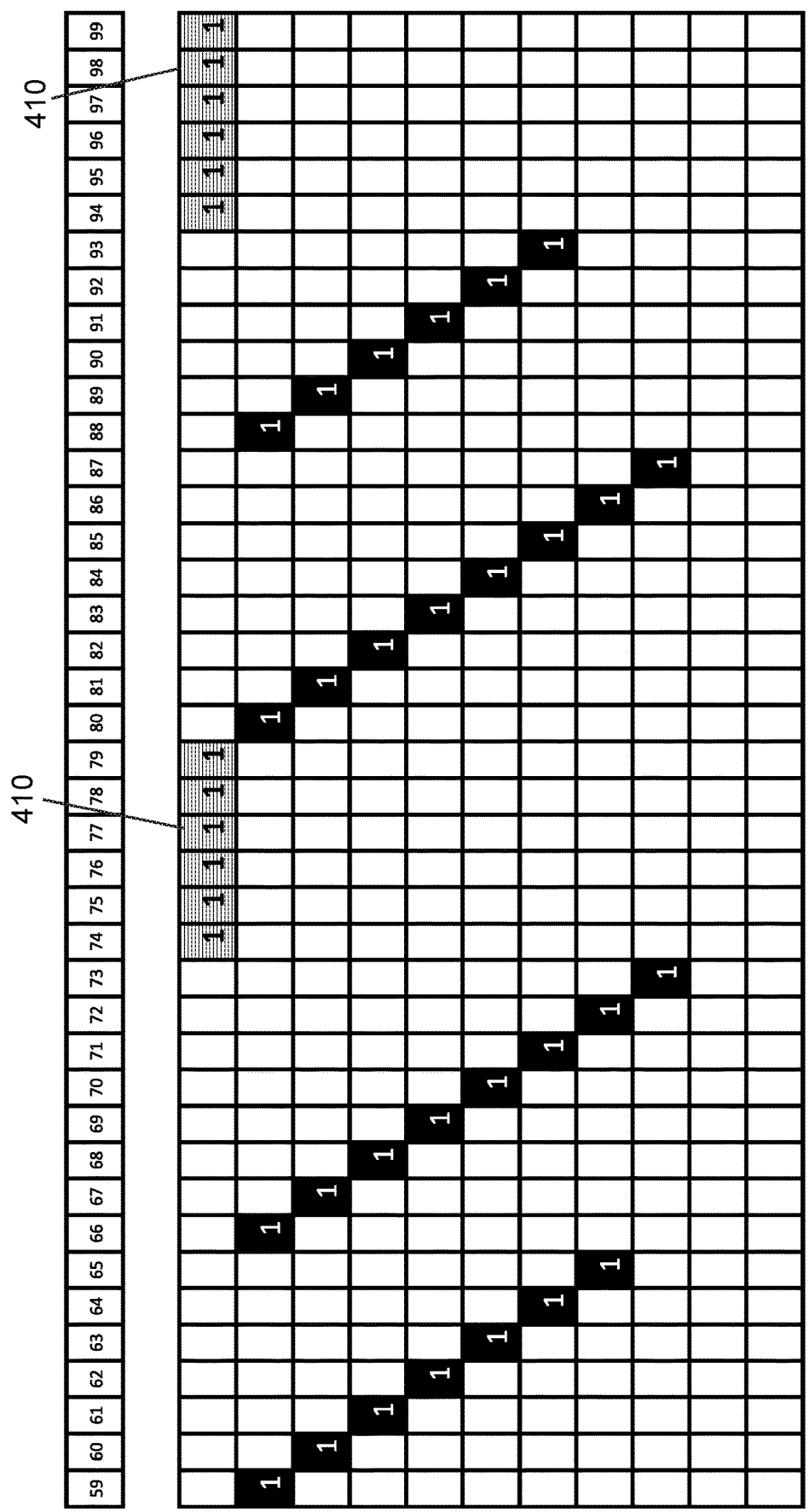

Due to puncturing, some interlaces may no longer meet bandwidth occupancy requirements or rules, such as those set by ETSI. Therefore, the interlaces cannot be allocated for the UE alone, and may need to be included with one of the regular interlaces 1, 2, 3, and 4. In certain embodiments, at least one interlace, which does not meet bandwidth requirements, and at least one interlace that does meet bandwidth requirements may be combined. The combination of irregular and regular interlaces can result in legal allocation from a bandwidth occupancy perspective, meaning that the combination can comply with occupancy requirements. Irregular interlaces are those interlaces that do not meet the bandwidth occupancy requirement or rule, as will be discussed below. In certain embodiments, the number of physical resource blocks on the irregular interlace is less than the number of physical resource blocks on the regular interlace FIG. 4A illustrates an assignment according to certain embodiments. In particular, FIG. 4A illustrates an assignment based on PRBs with variable spacing, meaning that the assignment of PUSCH and/or PUCCH is not fixed. This embodiment of FIG. 4A can be contrasted to the embodiment of FIG. 3, in which the assignment of PUSCH and/or PUCCH is fixed to 10 PRBs. As can be seen in FIG. 4A, the interlaces are arranged with variable spacing, meaning that there can be more or less than 10 PRBs between PUSCH and/or PUCCH.

Variable spacing allows for a large number of 10 PRB interlaces that can be allocated for the UE alone. While the spacing between PRACH clusters 410 within the interlaces varies, interlaces 1 through 6 can fulfill bandwidth occupancy requirements. For example, the variable spacing can allow the embodiment of FIG. 4A to meet those regulations set out by ETSI, because they occupy at least 89 PRBs. The 89 PRBs may correspond to an 80% occupancy requirement (180 kHz*89>16 MHz). Interlaces 7 and 8, on the other hand, occupy only 10 PRBs and 6 PRBs, respectively, and do not meet the necessary bandwidth requirement. Interlaces 7 and 8 can be irregular interlaces, since they do not meet the necessary bandwidth requirement on their own, and can be combined with one or more regular interlaces, as discussed above.

Figure 4B:
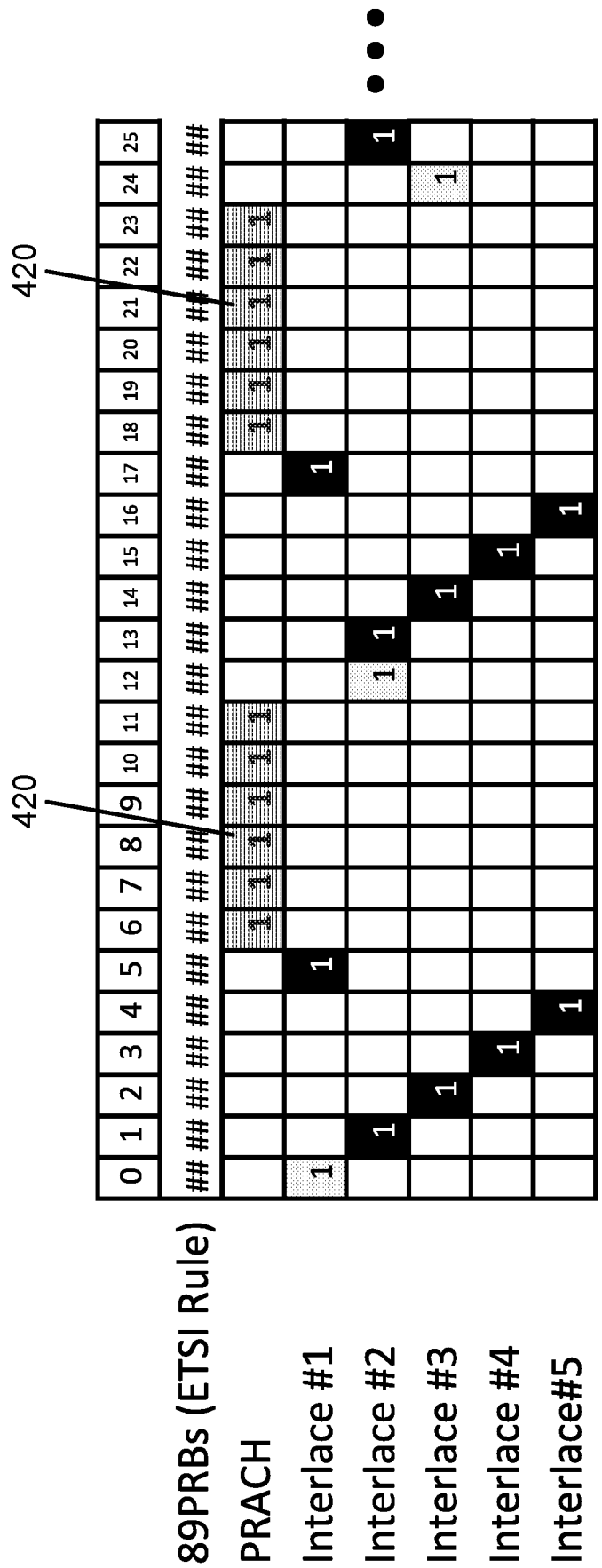
FIG. 4B illustrates an assignment according to certain embodiments.
Figure 4B:
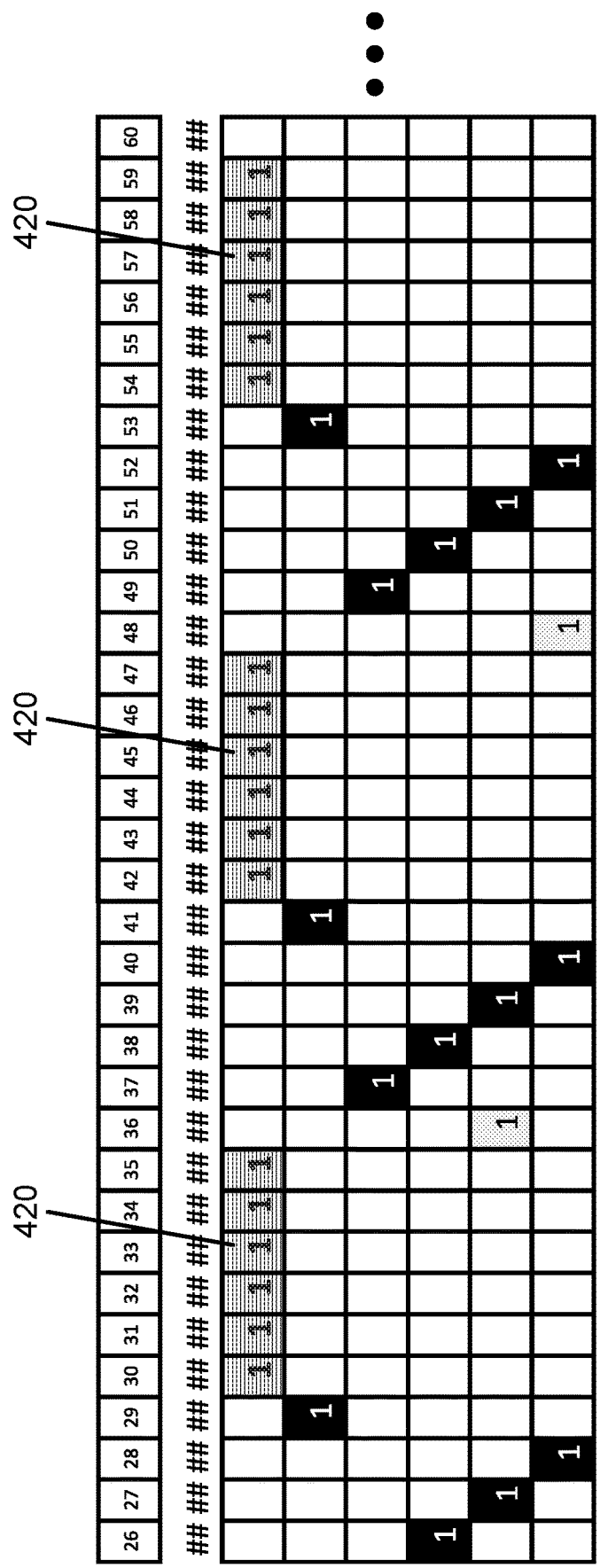
Figure 4B:
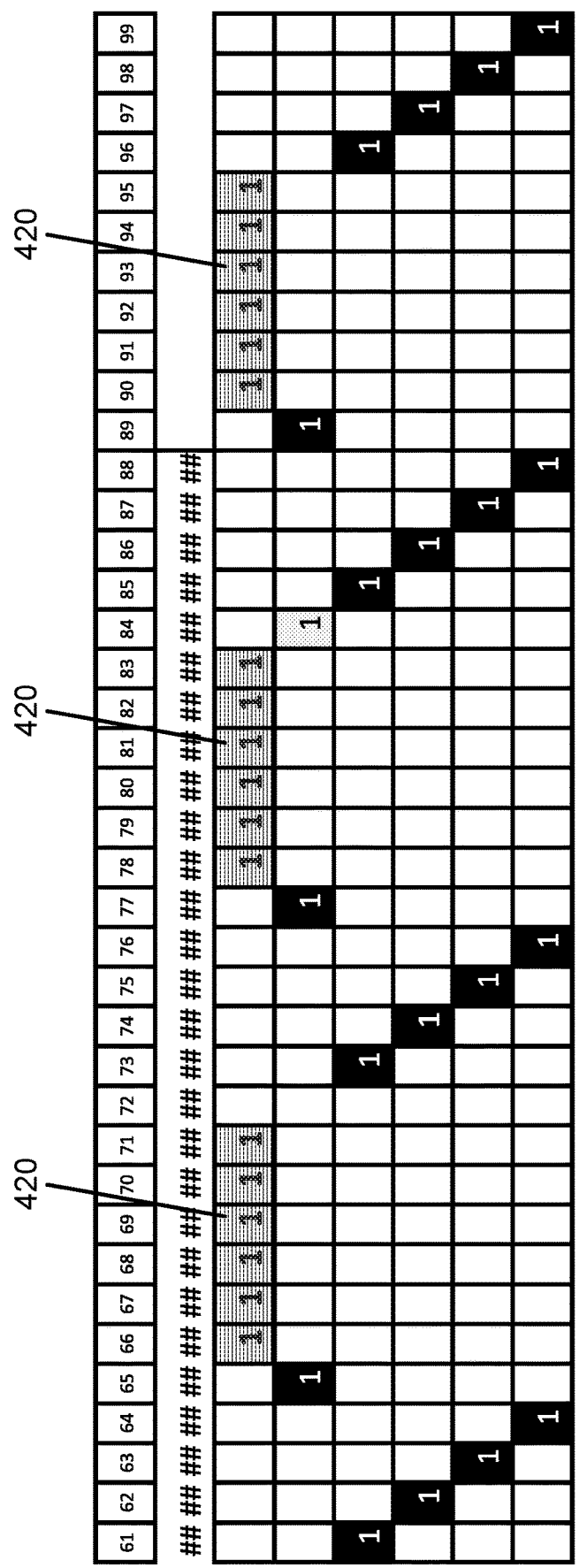

FIG. 4B illustrates an assignment according to certain embodiments. In particular, FIG. 4B illustrates an embodiment based on PRBs with variable spacing that can help maximize transmission power. As can be seen in FIG. 4B, there are eight PRACH clusters N, each occupying six PRBs in a row M. In certain embodiments, some PRBs may be manually defined, meaning that it may not be possible to get a fully even distribution of the PRBs. For example, there can be an equal number of PRBs for each interlace, but the PRBs may be distributed manually in order to achieve a distribution that is as close to even as possible.

The embodiments shown in FIGS. 3 and 4A each have their own unique benefits. The fixed assignment of FIG. 3 can provide for a simpler resource mapping, and a lower specification impact. A lower specification impact can mean that the PUSCH interlace structure can be based on evenly-distributed PRBs. The variable assignment of FIG. 4A, on the other hand, has the benefit of providing more full 10-PRB interlaces that fulfill an occupancy bandwidth requirement, for example, a requirement set by ETSI.

FIG. 5 illustrates an assignment according to certain embodiments. In particular, FIG. 5 illustrates an assignment in both the frequency domain, for example, in PRBs, and in the time domain, for example, in Discrete Fourier Transform Spread orthogonal frequency division modulation (DFT-S-OFDMA). Due to LBT in DFT-S-OFDMA symbol 0, there are no UL transmissions in the embodiment of FIG. 5. PRACH transmission may use two DFT-S-OFDMA, for example, DFT-S-OFDMA symbols 1 and 2, in the time domain. In the frequency domain, PRACH transmission 530 uses four clusters N, with each cluster occupying six PRBs.

As for PUSCH and/or PUCCH interlaces, 1, 2, 3, and 4 are left untouched and consist of 10 PRBs. Interlace 1, for example, may be interlace 510 of FIG. 5, which is a regular interlace with 10 PRBs. Interlace 5, for example, may be interlace 520 of FIG. 5. Both interlace 5 and interlace 10, which is not highlighted in FIG. 5, in contrast to interlace 1, may be punctured by REs used by PRACH 530 in DFT-S-OFDM symbols 1 and 2, but remain unchanged in the other symbols.

The interlaces shown in FIG. 5 can still be used on their own without violating bandwidth occupancy requirements, meaning that they can be labeled as regular interlaces. The PUSCH and/or PUCCH transmissions in the interlaces can span more than 80% of the nominal bandwidth in most of the DFT-S-OFDM symbols. In other words, even if not every single DFT-S-OFDM symbol can surpass the bandwidth occupancy threshold, as long as the interlaces as a whole surpass the bandwidth occupancy threshold the interlaces can be said to meet the set bandwidth occupancy requirement.

When the user equipment allocates both untouched interlaces, such as interlace 510, and punctured interlaces, such as interlace 520, transmission power may be changed between DFT-S-OFDMA symbols 1 and 2, as well as symbols 3 through 13, so that the PSD remains constant across all DFT-S-OFDMA symbols on the untouched interlaces. Untouched interlaces are those interlaces that have not been punctured. Transmitted PSD may be determined based on transmission occurring during symbols 3 through 13 so that the user equipment's maximum transmission power is not exceeded.

In certain embodiments in which the PUSCH and/or PUCCH interlace is punctured by PRACH, as shown in FIGS. 3 and 5, actual data uplink channel transmission may not be punctured. PUSCH/PUCCH transmissions can either rate match around the PRBs or REs used by PRACH, or be punctured in those PRBs or REs. Rate matching around can mean that the PRACH will not cause puncturing of the PRBs allocated to the PUSCH and/or PUCCH. Rather, the PUSCH/PUCCH will occupy PRBs around the PRACH. The basic function of rate matching may be to match the number of bits in a transport block (TB) to the number of bits that can be transmitted in the given allocation with the available number of REs. In embodiments involving puncturing, data corresponding to certain REs may not be transmitted at all.

In other embodiments, when PRACH overlaps with demodulation reference signals (DMRS) symbols on PUSCH and/or PUCCH interlaces, DMRS sequence may be either punctured or DMRS sequence length may be changed according to number of REs available for DMRS on the symbol. DMRS length may vary in certain embodiments according to, for example, the number of PRBs available in the current symbol or the number of available REs.

While the embodiments shown in FIGS. 3, 4A, 4B, and 5 all have a six PRACH clusters, the size of the cluster can be changed to be any other number that may be used to meet bandwidth occupancy needs. Similarly, a 10-interlace structure, as shown in FIG. 1, has been used throughout the detailed examples provided above. In certain embodiments the interlace structure may contain any parameter that may be used to satisfy bandwidth occupancy rules. For example, the interlace structure may be lengthened or shortened, so as to deviate from the 10-interlace structure. Furthermore, the design can be based on, for example, a structure having 5 interlaces, 8 interlaces, or 12 interlaces. However, the above embodiments can be scaled to any interlaces structure defined for PUSCH/PUCCH.

In certain embodiments, the UE may determine the PRACH configuration. As shown in step 210 of FIG. 2, the UE may determine an assignment of a first set of PRBs in an unlicensed spectrum to a PRACH. The PRACH occupies at least one of the PRBs. The at least one of the PRBs occupied by the PRACH may be distributed into clusters in a frequency domain. The UE may determine a PRACH assignment in a time domain, for example, a subframe to be used for PRACH transmission or DFT-S-OFDM symbols in a subframe used for PRACH. The UE may also determine an assignment of PRACH in a frequency domain, for example, the number of PRACH clusters N used in the cells, each cluster having M number of consecutive PRBs.

The PRACH configuration, in certain embodiments, may comprise an LTE PRACH sequences placed such that the separation between the outermost PRACH PRBs is at least 89 PRBs.

In step 220 of FIG. 2, the UE determines an assignment, when the user equipment has reason to transmit data, of a second set of at least one remaining PRBs to at least one uplink channel. The uplink channel may be a PUSCH and/or a PUCCH. The UE can receive an uplink grant for PUSCH transmission in a subframe with PRACH resources. As described in FIGS. 3, 4A, 4B, and 5, the UE may determine resource allocation differently, for example, the UE may determine regular or irregular interlaces, as well as PRBs with fixed spacing or with variable spacing. In certain embodiments involving one or more irregular interlaces, the user equipment may puncture or rate match PUSCH and/or PUCCH around the available PRBs. Doing so may leave the PRBs reserved for PRACH unoccupied.

Figure 6:
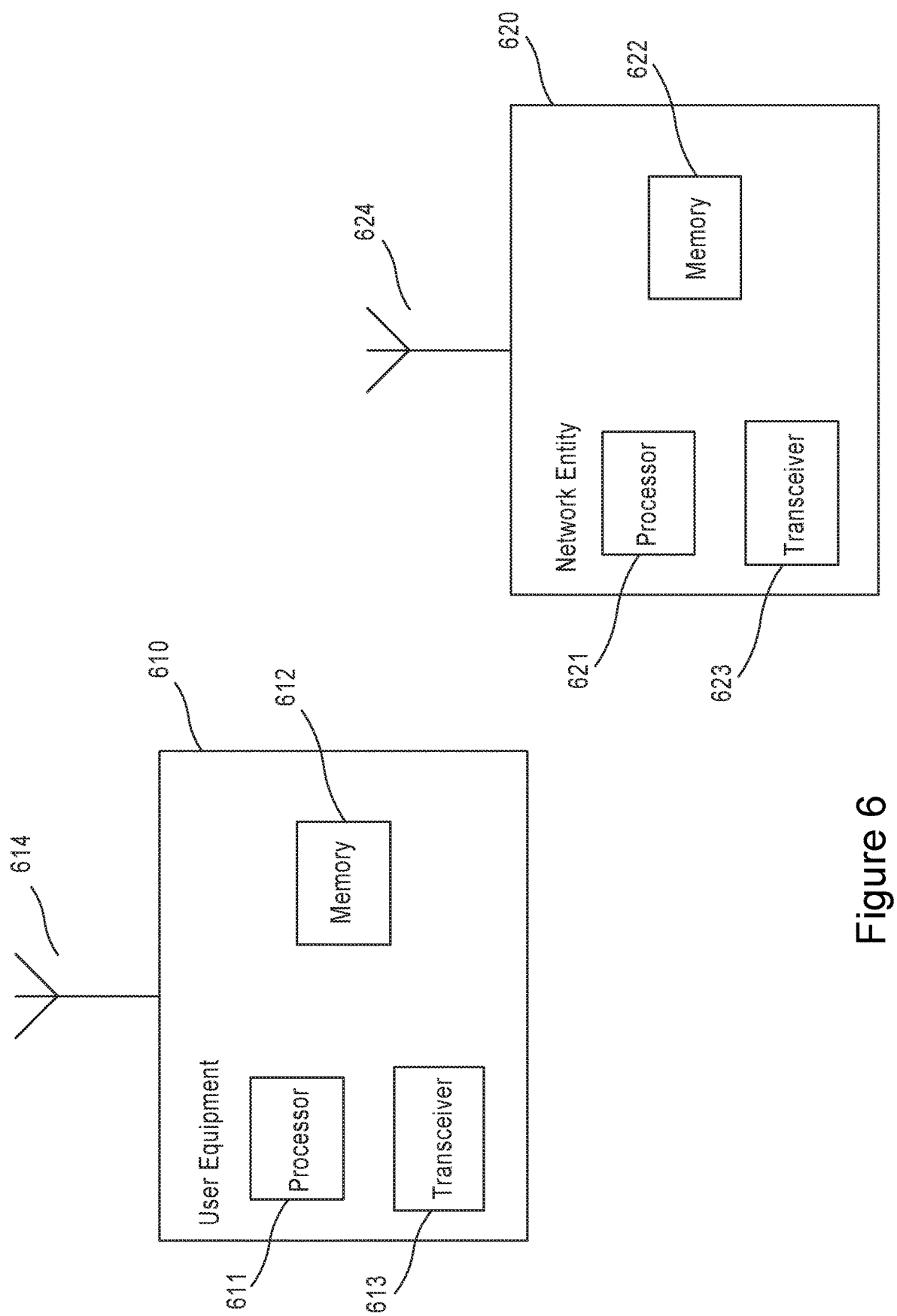
FIG. 6 illustrates a system diagram according to certain embodiments.

FIG. 6 illustrates a system according to certain embodiments. It should be understood that each block of the flowchart of FIG. 6 involved in FIG. 2, and as described in relation to FIGS. 3, 4A, 4B, and 5, or any combination thereof, may be implemented by various means or their combinations, such as hardware, software, firmware, one or more processors and/or circuitry. In one embodiment, a system may include several devices, such as, for example, network entity 620 or UE or user device 610. The system may include more than one UE 610 and more than one network entity 620, although only one access node shown for the purposes of illustration. An network entity can be a network node, a base station, an eNB, server, host, or any of the other access or network node discussed herein.

Each of these devices may include at least one processor or control unit or module, respectively indicated as 611 and 621. At least one memory may be provided in each device, and indicated as 612 and 622, respectively. The memory may include computer program instructions or computer code contained therein. One or more transceiver 613 and 623 may be provided, and each device may also include an antenna, respectively illustrated as 614 and 624. Although only one antenna each is shown, many antennas and multiple antenna elements may be provided to each of the devices. Other configurations of these devices, for example, may be provided. For example, network entity 620 and UE 610 may be additionally configured for wired communication, in addition to wireless communication, and in such a case antennas 614 and 624 may illustrate any form of communication hardware, without being limited to merely an antenna.

Transceivers 613 and 623 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 610 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiment, an apparatus, such as a user equipment, may include means for carrying out embodiments described above in relation to FIGS. 2, 3, 4A, 4B, and 5. In certain embodiments, at least one memory including computer program code can be configured to, with the at least one processor, cause the apparatus at least to perform any of the processes described herein.

According to certain embodiments, an apparatus 610 may include at least one memory 612 including computer program code, and at least one processor 611. The at least one memory 612 and the computer program code are configured, with the at least one processor 611, to cause the apparatus 610 at least to determine an assignment, at a user equipment, of a first set of physical resource blocks in an unlicensed spectrum to a physical random access channel. The physical random access channel occupies at least one of the physical resource blocks, and the at least one of the physical resource blocks occupied by the physical random channel are distributed into clusters in a frequency domain. The at least one memory 612 and the computer program code are also configured, with the at least one processor 611, to cause the apparatus 610 at least to determine an assignment, when the user equipment has reason to transmit data, of a second set of at least one remaining physical resource block of the physical resource blocks to at least one uplink channel. In addition, the at least one memory 612 and the computer program code are configured, with the at least one processor 611, to cause the apparatus 610 at least to transmit random access preambles through the physical radio access channel or the data through the at least one uplink channel from the user equipment to a network entity.

According to certain embodiments, an apparatus 610 may include means for determining an assignment, at a user equipment, of a first set of physical resource blocks in an unlicensed spectrum to a physical random access channel. The physical random access channel occupies at least one of the physical resource blocks, and the at least one of the physical resource blocks occupied by the physical random channel are distributed into clusters in a frequency domain. The apparatus 610 may also include means for determining an assignment, when the user equipment has reason to transmit data, of a second set of at least one remaining physical resource block of the physical resource blocks to at least one uplink channel. In addition, apparatus 610 may also include means for transmitting random access preambles through the physical radio access channel or the data through the at least one uplink channel from the user equipment to a network entity.

Processors 611 and 621 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 620 or UE 610, to perform any of the processes described above (see, for example, FIG. 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 6 illustrates a system including an network entity 620 and UE 610, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 610 may likewise be provided with a variety of configurations for communication other than communication network entity 620. For example, the UE 610 may be configured for device-to-device communication.

Certain embodiments provide for an optimized framework for B-IFDMA resource allocation in the presence of signals that do not follow a B-IFDMA structure, such as PRACH. These embodiments allow for the efficiency multiplexing of PRACH, PUSCH, and/or PUCCH. The above embodiments can ensure that PRACH overhead can be minimized, while allowing the eNB to reuse existing hardware for PRACH detection, and supporting good PRACH coverage in PSD-limited scenarios.

Certain embodiments may further advance current deployment scenarios for existing LAA/multi-frame design. Such embodiments may include, for example, carrier aggregation with repeaters, dual connectivity, and shared spectrum scenarios, for example, a 3.5 GHz band. Implementation of the above embodiments can allow for PRACH resources to be configured to enable different tradeoffs between PRACH overheard and coverage.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary

3GPP Third Generation Partnership Project
ACK Acknowledgement
BW Bandwidth
CA Carrier Aggregation
CCE Control Channel Element
CRC Cyclic Redundancy Check
CSI Channel State Information
DFT-S-OFDM Discrete Fourier Transformation Spread OFDM
DL Downlink
DMRS Demodulation Reference Signal
DTX Discontinuous Transmission
eNB Evolved NodeB
ETSI European Telecommunications Standards Institute
FDD Frequency Division Duplex
FDM Frequency Division Multiplex
HARQ Hybrid Automatic Repeat Request
IFDMA Interleaved Frequency Division Multiple Access
LAA Licensed Assisted Access
LBT Listen-Before-Talk
LTE Long Term Evolution
NACK Negative Acknowledgement
NDI New Data Indicator
OFDM Orthogonal Frequency Division Modulation
OFDMA Orthogonal Frequency Division Multiple Access
OCC Orthogonal Cover Code
SC-FDMA Single-Carrier Frequency Division Multiple Access
PCell Primary cell
PDSCH Physical Downlink Shared Control Channel
PSD Power Spectral Density
PUCCH Physical Uplink Control Channel
PUSCH Physical Uplink Shared Channel
RPF RePetition Factor
SCell Secondary cell (operating on un-licensed carrier in this IPR)
TB Transmission Block
TDD Time Division Duplex
TDM Time Division Multiplex
TX Transmission
TXOP Transmission Opportunity
UCI Uplink Control Information
UE User Equipment
UL Uplink

We claim:

1. A method, comprising:
   determining an assignment, at a user equipment, of a first set of physical resource blocks to a physical random access channel, wherein the physical random access channel occupies at least one of the physical resource blocks, and
   wherein the at least one of the physical resource blocks occupied by the physical random channel are distributed into clusters in a frequency domain;
   determining an assignment, when the user equipment transmits data, of a second set of at least one remaining physical resource block of the physical resource blocks to at least one uplink channel; and
   transmitting random access preambles through the physical random access channel or data through the at least one uplink channel from the user equipment to a network entity;
   wherein the assignment of the first set and the assignment of the second set are configured according to a predetermined bandwidth occupancy requirement for reliable operation with listen-before-talk; and
   wherein separation between the two outermost physical resource blocks assigned to the physical random access channel represents at least 80% of the channel bandwidth.

2. A non-transitory computer-readable medium encoded with instructions that, when executed in hardware, perform a process, the process comprising the method according to claim 1.

3. The method according to claim 1, wherein a minimum spacing between two physical resource blocks assigned to the physical random access channel is defined so that there is only one cluster per power spectral density measurement bandwidth.

4. The method according to claim 1, wherein a minimum spacing between two physical resource blocks assigned to the physical random access channel is defined so that there is only one cluster per power spectral density measurement bandwidth.

5. A method, comprising:
   determining an assignment of a first set of physical resource blocks to a physical random access channel, wherein the physical random access channel occupies at least one of the physical resource blocks, and
   wherein the at least one of the physical resource blocks occupied by the physical random channel are distributed into clusters in a frequency domain;
   determining an assignment, when a user equipment transmits data, of a second set of at least one remaining physical resource block of the physical resource blocks to at least one uplink channel; and
   receiving random access preambles through the physical random access channel or data through the at least one uplink channel from the user equipment to a network entity;
   wherein the assignment of the first set and the assignment of the second set are configured according to a predetermined bandwidth occupancy requirement for reliable operation with listen-before-talk; and wherein separation between the two outermost physical resource blocks assigned to the physical random access channel represents at least 80% of the channel bandwidth.

6. A non-transitory computer-readable medium encoded with instructions that, when executed in hardware, perform a process, the process comprising the method according to claim 5.

7. An apparatus comprising:
- at least one memory comprising computer program code;
- at least one processor;
- wherein the at least one memory and the computer program code are configured, with the at least one processor, to cause the apparatus at least to:
- determine an assignment, at a user equipment, of a first set of physical resource blocks in an unlicensed spectrum to a physical random access channel, wherein the physical random access channel occupies at least one of the physical resource blocks, and
- wherein the at least one of the physical resource blocks occupied by the physical random channel are distributed into clusters in a frequency domain;
- determine an assignment when the user equipment transmits data, of a second set of at least one remaining physical resource block of the physical resource blocks to at least one uplink channel; and
- transmit random access preambles through the physical random access channel or data through the at least one uplink channel from the user equipment to a network entity;
- wherein the assignment of the first set and the assignment of the second set are configured according to a predetermined bandwidth occupancy requirement for reliable operation with listen-before-talk; and
- wherein separation between the two outermost physical resource blocks assigned to the physical random access channel represents at least 80% of the channel bandwidth.

8. The apparatus according to claim 7, wherein a minimum spacing between two physical resource blocks assigned to the physical random access channel is defined so that there is only one cluster per power spectral density measurement bandwidth.

9. The apparatus according to claim 7, wherein the second set of physical resource blocks are arranged to form at least one regular interlace, wherein the regular interlace has equal spacing between all neighboring clusters of the regular interlace.

10. The apparatus according to claim 7, wherein the second set of the physical resource blocks are arranged to form at least one irregular interlace, wherein a number of physical resource blocks on the irregular interlace is less than a number of physical resource blocks on the regular interlace.

11. The apparatus according to claim 10, wherein the at least one irregular interlace does not fulfill a predetermined bandwidth occupancy requirement.

12. The apparatus according to claim 10, wherein the at least one irregular interlace is used only in combination with the at least one regular interlace.

13. The apparatus according to claim 7, wherein a plurality of the at least one of the physical resource blocks occupied by the physical radio access channel covers at least two of the clusters, wherein each of the clusters covers six consecutive physical resource blocks.

14. The apparatus according to claim 7, wherein the transmitted preamble comprises a Long Term Evolution physical random access channel preamble with at least one of a predetermined preamble format, a preamble sequence, or a cyclic shift mapped to each of the clusters in the frequency domain.

15. The apparatus according to claim 7, wherein the at least one of the physical resource blocks of the second set are distributed into interlaces, each interlace comprising of clusters of at least one resource block in the frequency domain.

16. The apparatus according to claim 7, wherein the data comprises at least one of a user data or a control data.

17. The apparatus according to claim 7, further comprising:
- receiving information regarding the assignment of at least one of the first set or the second set of physical resource blocks from a higher layer signal.

18. The apparatus according to claim 7, wherein assignment of the physical resource access channel is in a time domain.

19. An apparatus comprising:
- at least one memory comprising computer program code;
- at least one processor;
- wherein the at least one memory and the computer program code are configured, with the at least one processor, to cause the apparatus at least to:
- determine an assignment of a first set of physical resource blocks to a physical random access channel, wherein the physical random access channel occupies at least one of the physical resource blocks, and
- wherein the at least one of the physical resource blocks occupied by the physical random channel are distributed into clusters in a frequency domain;
- determine an assignment, when a user equipment transmits data, of a second set of at least one remaining physical resource block of the physical resource blocks to at least one uplink channel; and
- receive random access preambles through the physical random access channel or data through the at least one uplink channel from the user equipment to a network entity;
- wherein the assignment of the first set and the assignment of the second set are configured according to a predetermined bandwidth occupancy requirement for reliable operation with listen-before-talk;
- wherein separation between the two outermost physical resource blocks assigned to the physical random access channel represents at least 80% of the channel bandwidth.

* * * * *